United States Patent
Brotz

Patent Number: 5,588,295
Date of Patent: Dec. 31, 1996

[54] TRI-STRIP MEMORY METAL ACTUATOR

[76] Inventor: Gregory R. Brotz, P.O. Box 1322, Sheboygan, Wis. 53081

[21] Appl. No.: 532,352

[22] Filed: Sep. 22, 1995

Related U.S. Application Data

[63] Continuation-in-part of Ser. No. 349,793, Dec. 6, 1994, which is a continuation-in-part of Ser. No. 921,631, Jul. 30, 1992, abandoned.

[51] Int. Cl.⁶ ..................................................... F01B 29/10
[52] U.S. Cl. ...................................... 60/528; 60/527
[58] Field of Search ........................................ 60/528, 527

[56] References Cited

U.S. PATENT DOCUMENTS

| | | | |
|---|---|---|---|
| 2,487,947 | 11/1949 | Senn | 60/528 |
| 4,551,975 | 11/1985 | Yamamoto et al. | 60/528 |
| 4,553,393 | 11/1985 | Ruoff | 60/528 |
| 4,556,050 | 12/1985 | Hodgson et al. | 60/527 |
| 4,636,149 | 1/1987 | Brown | 60/528 |
| 5,335,498 | 8/1994 | Komatsu et al. | 60/528 |

*Primary Examiner*—John T. Kwon
*Attorney, Agent, or Firm*—William Nitkin

[57] ABSTRACT

A tri-strip memory metal actuator is disclosed using first and second oppositely arcuate strips of electrically conductive or semiconductive memory metal, each bound respectively to opposite sides of a straight central strip of electrically conductive material to form, when current is applied therethrough, a Peltier junction causing one of the arcuate strips to heat and return to its memory metal state while the other of the arcuate strips cools and bends along with the central strip to the arcuate shape of the heated strip which bending is reversible when current is applied in the opposite direction and which actuator, if no current is applied, is maintained in the straight position of the central strip.

2 Claims, 1 Drawing Sheet

5,588,295

TRI-STRIP MEMORY METAL ACTUATOR

This application is a continuation-in-part of my previous application for a Tri-metallic Semiconductor Strip, Ser. No. 08/349,793 filed Dec. 6, 1994, now pending, which was a continuation-in-part of my previous application for a Bimetallic Strip, Ser. No. 07/921,631 filed Jul. 30, 1992, now abandoned.

BACKGROUND OF THE INVENTION

1. Field of the Invention

The device of this invention resides in the area of actuators and more particularly relates to a tri-strip memory metal actuator which utilizes thermoelectric heating and cooling of a memory metal clad member.

2. Description of the Prior Art

U.S. Pat. No. 5,335,498 to Komatsu et al is illustrative of the prior art of actuators using memory metals with heating means to affect movement thereof. Also, U.S. Pat. No. 4,553,393 to Ruoff discloses memory metal actuators using the Peltier effect to cool and reset such actuators.

SUMMARY OF THE INVENTION

It is an object of this invention to provide a new and improved tri-strip memory metal actuator. To attain this general object, the tri-strip memory metal actuator of this invention generally includes a first arcuate strip that is comprised of a shape-memorizing alloy which is electrically conductive; a second arcuate strip that is also comprised of a shape-memorizing alloy commonly referred to as a memory metal which is electrically conductive; and a central strip that is comprised of a material that is dissimilar from the memory metals of the first and second strips, yet is also electrically conductive.

The instant invention utilizes the Peltier effect for its thermoelectric cooling and heating. The Peltier effect occurs herein when an electrical current is passed through three strips of metal laminated together to form two junctions, with the central strip composed of metal that is dissimilar from the metal composition of the outer two strips wherein one of the two junctions will cool while the other heats, depending on the direction of the current.

In some embodiments the outer memory metal strips and/or the central strip can be made of semiconducting material. In the science of thermoelectric cooling it has been found that junctions formed of semiconducting materials achieve the highest figure of merit.

The first arcuate strip of memory metal having thermoelectric properties has a convex side and a concave side. The second arcuate strip of memory metal having thermoelectric properties also has a convex side and a concave side. The generally straight, non-memory metal central strip having electrically conductive or semiconductive properties has a first side and a second side. The convex side of the first arcuate strip is laminated to the first side of the straight central strip so that the first arcuate strip is straightened out and forms a first junction with the central strip. Similarly, the convex side of the second arcuate strip is attached to the second side of the central strip and opposite to the curvature of the first strip so that the second arcuate strip is straightened out and forms a second junction with the central strip. The arcuate strips can be laminated, clad or otherwise attached to the central strip by spot welding, gluing or other suitable means of attachment.

The straight central strip is composed of a material dissimilar from the material of the first and second arcuate strips so that the arcuate strips attached, respectively, to the first side and second side of the central strip can form a Peltier junction for thermoelectric cooling at one junction. Passing a current from one arcuate strip through the central strip to the other arcuate strip causes the second junction to cool, and electrical resistance causes the first junction to heat. The second arcuate strip, forming the second junction that cools, becomes amorphous, formable and malleable and thus non-resistant to deforming, while the first actuate strip forming the first junction that heats crystallizes and assumes its original arcuate shape based on its "memory" thus supplying the energy to deform the actuator. The actuator, therefore, bends and assumes the arcuate shape of the first arcuate strip. Reversing the current direction reverses the process and causes the actuator to bend in the opposite direction and assume the arcuate shape based on the "memory" of the second arcuate strip.

DESCRIPTION OF THE PREFERRED EMBODIMENT(S)

Figure 1:
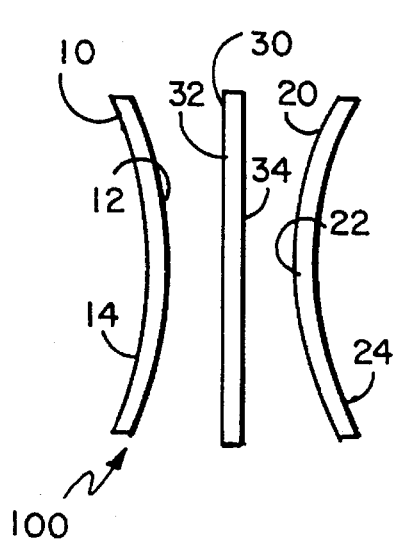
FIG. 1 illustrates an exploded side view of the preferred embodiment of the tri-strip memory metal actuator of this invention.

FIG. 1 illustrates the tri-strip memory metal actuator 100 of this invention which generally includes first arcuate strip 10 comprised of memory metal that is electrically conductive or semiconductive and a second arcuate strip 20 comprised of a memory metal that is electrically conductive or semiconductive and each having the same transport sign. Disposed therebetween is central strip 30 comprised of a material that is dissimilar to strips 10 and 20, and which is also electrically conductive or semiconductive and having an opposite transport sign from that of the first and second arcuate strips. In FIG. 1 it can be seen that first arcuate strip 10 composed of memory metal has convex side 12 and concave side 14. Second arcuate strip 20 of memory metal has convex side 22 and concave side 24, having a bend opposite that of first arcuate strip 10. Straight central strip 30, having electrically conductive or semiconductive properties of opposite transport sign from that of the first and second arcuate strips, has first side 32 and second side 34.

Figure 2:
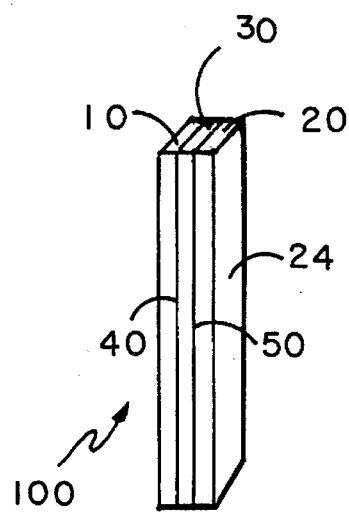
FIG. 2 illustrates a perspective view of the embodiment of FIG. 1.

FIG. 2 illustrates convex side 12 of first arcuate strip 10 being clad or otherwise attached to first side 32 of central strip 30, so that first arcuate memory metal strip 10 is straightened out and forms a first junction 40 with central strip 30. Similarly, convex side 22 of second arcuate strip 20 is clad or otherwise attached to second side 34 of central strip 30 so that second arcuate strip 20 is straightened out and forms a second junction 50 with central strip 30. Central strip 30 is composed of a material dissimilar from the material of first and second arcuate strips 10 and 20 so that the arcuate strips attached to first and second sides 32 and 34 of central strip 30 each form a Peltier junction to affect thermoelectric cooling and heating depending on the direction of the current through the strips.

Figure 3:
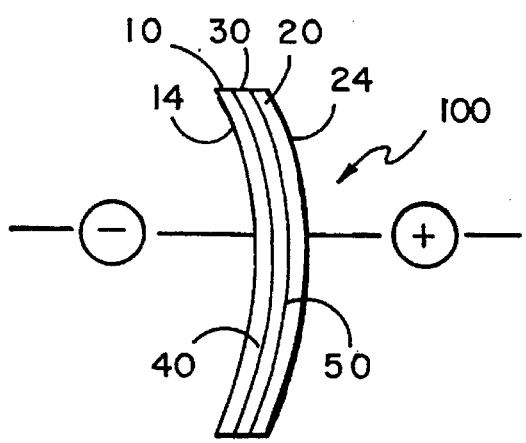
FIG. 3 illustrates a side view of the embodiment of FIG. 1, showing a current being applied to the actuator in one direction.
Figure 4:
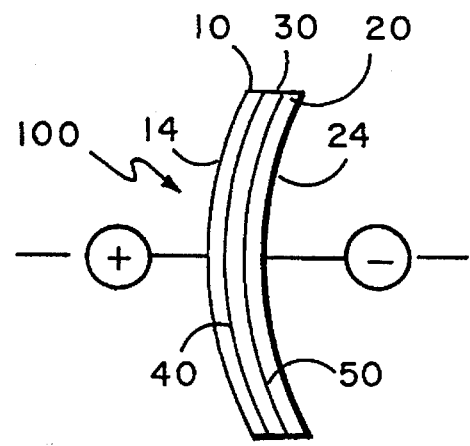
FIG. 4 illustrates a side view of the actuator of FIG. 3, showing the current direction being reversed and the actuator being bent in the other direction from that of FIG. 3.

FIGS. 3 and 4 illustrate the effect of passing current through the strips. FIG. 3 illustrates current passing from second arcuate strip 20 through central strip 30 to first arcuate strip 10, causing second junction 50 to cool and first junction 40 to heat. Second arcuate strip 20 forming second junction 50 with central strip 30 cools, becomes amorphous, malleable and formable and thus non-resistant to deforming while first arcuate strip 10 forming first junction 40 with the central strip, heats, crystallizes and assumes its original arcuate memory shape, thus supplying the energy to deform actuator 100. Actuator 100, therefore, bends and assumes the arcuate memory shape of first arcuate strip 10. Reversing the direction of the current, as seen in FIG. 4, reverses the effect and causes actuator 100 to bend in the opposite direction and assume the arcuate memory shape of second arcuate strip 20.

The central strip or "clad" is not a memory metal but should be selected of a material which can form the highest figure of merit junction with the memory material composing the outer clads while still remaining very flexible as one side of it is heated and the other cooled. The outer first and second arcuate strips 10 and 20 can be made from the same material but with different memory characteristics to cause selected differing degrees of bending of each strip to effect movement of the actuator. Memory metals are well known and can be made of a variety of materials such as tin/nickel 50—50 alloy which, depending on how it is processed, will have a different memory characteristic and movement function based on its temperature.

Although the present invention has been described with reference to particular embodiments, it will be apparent to those skilled in the art that variations and modifications can be substituted therefor without departing from the principles and spirit of the invention.

I claim:

1. An actuator, comprising:

a first arcuate strip of memory metal having electrically conductive properties, said first arcuate strip having a convex side and a concave side;

a second arcuate strip of memory metal having electrically conductive properties, said second arcuate strip having a convex side and a concave side; and a straight central strip of material having electrically conductive properties, said central strip being composed of a material dissimilar from that of said first and second arcuate strips; said central strip having a first side and a second side, said convex side of said first arcuate strip, when in its memory shape state, being attached to said first side of said central strip and forms a first junction with said central strip, said convex side of said second arcuate strip being attached to said second side of said central strip and forms a second junction with said central strip, so that said first and second arcuate strips clad, respectively, on said first and second sides of said central strip form a Peltier junction whereby passing a current through said strips of said actuator causes one of said junctions to heat and the other junction to cool and become amorphous, malleable and formable while said arcuate strip forming said junction that heats crystallizes and assumes its original arcuate shape thereby causing said actuator to bend and assume that arcuate shape, said actuator when the direction of said current is reversed bending in the opposite direction and assuming the arcuate shape of the other arcuate strip.

2. An actuator, comprising:

a first arcuate strip of memory metal having electrically semiconductive properties and a transport sign, said first arcuate strip having a convex side and a concave side;

a second arcuate strip of memory metal having electrically semiconductive properties and a transport sign the same as said transport sign of said first arcuate strip, said second arcuate strip having a convex side and a concave side; and a straight central strip of material having electrically semiconductive properties, said central strip being composed of a material dissimilar and of opposite transport sign from that of said first and second arcuate strips; said central strip having a first side and a second side, said convex side of said first arcuate strip, when in its memory state, being attached to said first side of said central strip and forms a first junction with said central strip, said convex side of said second arcuate strip being attached to said second side of said central strip and forms a second junction with said central strip, so that said first and second arcuate strips clad, respectively, on said first and second sides of said central strip form a Peltier junction whereby passing a current through said strips of said actuator causes one of said junctions to heat and the other junction to cool and become amorphous, malleable and formable while said arcuate strip forming said junction that heats crystallizes and assumes its original arcuate shape, thereby causing said actuator to bend and assume that arcuate shape, said actuator when the direction of said current is reversed bending in the opposite direction and assuming the arcuate shape of the other arcuate strip.

\* \* \* \* \*